United States Patent
Odenheimer

(10) Patent No.: US 9,350,625 B2
(45) Date of Patent: May 24, 2016

(54) SERVICE CONSUMPTION BASED ON GAMIFICATION LEVEL CLASSIFICATION

(71) Applicant: Jens Odenheimer, Karlsruhe (DE)

(72) Inventor: Jens Odenheimer, Karlsruhe (DE)

(73) Assignee: SAP SE, Walldorf (DE)

( * ) Notice: Subject to any disclaimer, the term of this patent is extended or adjusted under 35 U.S.C. 154(b) by 340 days.

(21) Appl. No.: 13/926,259

(22) Filed: Jun. 25, 2013

(65) Prior Publication Data

US 2014/0379914 A1    Dec. 25, 2014

(51) Int. Cl.
*G06F 15/16* (2006.01)
*H04L 12/24* (2006.01)

(52) U.S. Cl.
CPC ........ *H04L 41/5041* (2013.01); *H04L 41/5061* (2013.01); *H04L 41/5096* (2013.01)

(58) Field of Classification Search
CPC ................... H04L 41/5041; H04L 41/2416
USPC ......................................................... 709/225
See application file for complete search history.

(56) References Cited

U.S. PATENT DOCUMENTS

| | | | |
|---|---|---|---|
| 8,209,758 B1 | 6/2012 | Doukhvalov et al. | |
| 2004/0064557 A1* | 4/2004 | Karnik et al. ................. | 709/225 |
| 2006/0074755 A1 | 4/2006 | Juetten et al. | |
| 2008/0022370 A1 | 1/2008 | Beedubail et al. | |
| 2009/0013038 A1 | 1/2009 | Vogler | |
| 2011/0208788 A1 | 8/2011 | Heller et al. | |
| 2012/0232971 A1 | 9/2012 | Pabst et al. | |
| 2012/0270661 A1 | 10/2012 | Smith et al. | |
| 2012/0331036 A1 | 12/2012 | Duan et al. | |
| 2013/0018838 A1 | 1/2013 | Parnaby et al. | |
| 2013/0079128 A1 | 3/2013 | Thomas et al. | |
| 2013/0091149 A1 | 4/2013 | Dunn et al. | |
| 2013/0103973 A1 | 4/2013 | Werth et al. | |
| 2013/0124268 A1 | 5/2013 | Hatton et al. | |

OTHER PUBLICATIONS

"The CMO's Guide to Beating the Engagement Crisis", Badgeville, (2013), 9 pgs.
Al Masud, Shah Murtaza Rashid, "An Extended and Granular Classification of Cloud's Taxonomy and Services", International Journal of Soft Computing and Engineering, vol. 2, Issue 2, (May 2012), 9 pgs.
Lightman, Ari, "Solving business problems with game-based design", PwC Technology Forecast, Issue 3, (2012), 76 pgs.

\* cited by examiner

*Primary Examiner* — Adnan Mirza
(74) *Attorney, Agent, or Firm* — Schwegman Lundberg & Woessner, P.A.

(57) ABSTRACT

Methods and systems of enabling service consumption based on gamification level classification are described. A request to use a first service of a service provider may be received from a user. A usage measure for the user and a first usage measure requirement for the first service of the service provider may be determined. The usage measure may be a measure of how much the user has used services of the service provider. It may be determined if the usage measure satisfies the first usage measure requirement. The user may be enabled to use the first service of the service provider in response to a determination that the usage measure satisfies the first usage measure requirement. The stored usage measure may be increased by a first amount in response to the user using the first service. The usage measure may be a level classification or a number of points.

13 Claims, 7 Drawing Sheets

SERVICE CONSUMPTION BASED ON GAMIFICATION LEVEL CLASSIFICATION

TECHNICAL FIELD

The present application relates generally to the technical field of data processing, and, in various embodiments, to methods and systems of enabling service consumption based on gamification level classification.

BACKGROUND

Today, there are several Platform as a Service (PaaS) offerings. However, not many of them are profitable. The PaaS provider is faced with the dichotomy of aggressive promotion and growth of the number of users of the platform on the one hand, and, on the other hand, keeping the cost per user down. The key cost per user factor is the cost of required support. There are different categories of users, each with their own skill set and demand for more specific support. The main cost drivers are not the few users that require expert support, but rather the large number of users that are not highly skilled and use features beyond their current scope.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Figure 1:
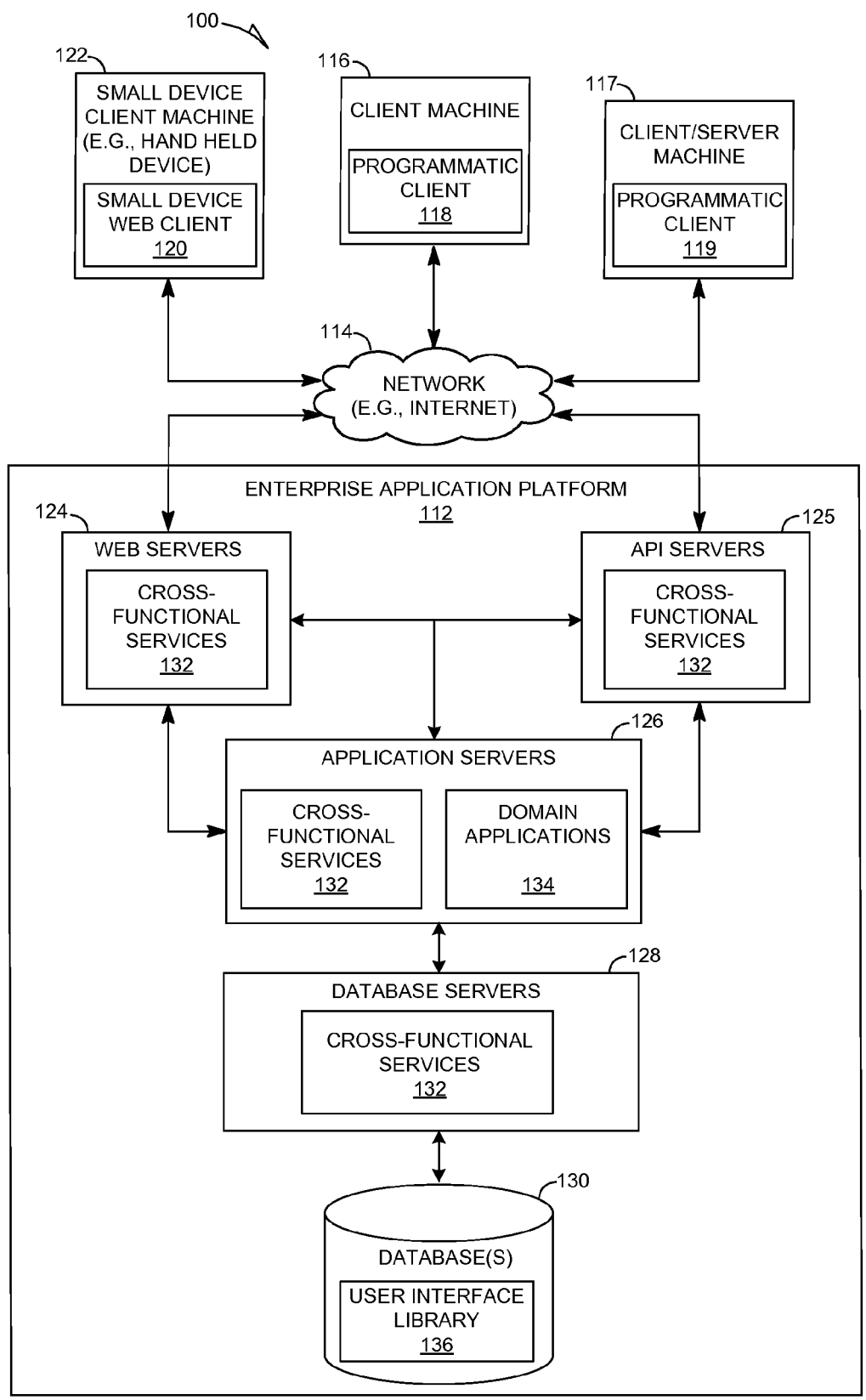
FIG. 1 is a network diagram illustrating a client-server system, in accordance with an example embodiment.

Example methods and systems of enabling service consumption based on gamification level classification are described. In the following description, for purposes of explanation, numerous specific details are set forth in order to provide a thorough understanding of example embodiments. It will be evident, however, to one skilled in the art that the present embodiments may be practiced without these specific details.

The techniques disclosed herein may limit the services that require a certain skill set to the respective group of more proficient users. Restrictions may be made on who may consume the services. In some embodiments, this restriction may be achieved by classifying the offered services into different levels (e.g., beginner, intermediate, expert). As a result of this classification, not all users can access advanced services, which means that not all users can request support for these services. In some embodiments, the classification is implemented in such a way that the beginner services require very little to no support and may be properly understood with static support, such as frequently asked questions (FAQ's), Wikis, videos, and other once-off support material. Coupling gamification levels to platform service consumption may link the enterprise to the consumer/developer in such a form as to increase engagement for the developer, while at the same time lowering total cost of ownership for the platform provider.

In some embodiments, a computer-implemented method may comprise: receiving, from a user, a request to use a first service of a service provider, determining a usage measure for the user and a first usage measure requirement for the first service of the service provider, determining if the usage measure satisfies the first usage measure requirement, and enabling, by a machine having a memory and a processor, the user to use the first service of the service provider in response to a determination that the usage measure satisfies the first usage measure requirement. The usage measure for the user may be a measure of how much the user has used services of the service provider.

In some embodiments, the usage measure may be a level classification, and the first usage measure requirement may be a minimum level classification required to use the first service of the service provider. In some embodiments, the usage measure may be a number of points, and the first usage measure requirement may be a minimum number of points required to use the first service of the service provider.

In some embodiments, the method may further comprise storing the usage measure, and increasing the stored usage measure by a first amount in response to the user using the first service. In some embodiments, the method may further comprise: receiving, from the user, a request to use a second service of the service provider, the second service being different from the first service, determining the stored usage measure for the user and a second usage measure requirement for the second service of the service provider, determining if the stored usage measure satisfies the second usage measure requirement, and enabling the user to use the second service of the service provider in response to a determination that the stored usage measure satisfies the second usage measure requirement. In some embodiments, the method may further comprise increasing the stored usage measure by a second amount in response to the user using the second service of the service provider, the second amount being different from the first amount.

In some embodiments, the method may further comprise presenting the user with a proposal to use an alternative service of the service provider instead of the first service in response to a determination that the usage measure does not satisfy the first usage measure requirement, but that the usage measure does satisfy an alternative usage measure requirement for the alternative service, and enabling the user to use the alternative service of the service provider.

In some embodiments, the service provider comprises a PaaS service provider.

In some embodiments, a system comprises a machine having a memory and at least one processor. The machine may be configured to: receive, from a user, a request to use a first service of a service provider, determine a usage measure for the user and a first usage measure requirement for the first service of the service provider, determine if the usage measure satisfies the first usage measure requirement, and enable the user to use the first service of the service provider in response to a determination that the usage measure satisfies the first usage measure requirement. The usage measure for the user may be a measure of how much the user has used services of the service provider.

In some embodiments, the usage measure may be a level classification, and the first usage measure requirement may be a minimum level classification required to use the first service of the service provider. In some embodiments, the usage measure may be a number of points, and the first usage measure requirement may be a minimum number of points required to use the first service of the service provider.

In some embodiments, the machine may be further configured to store the usage measure, and increase the stored usage measure by a first amount in response to the user using the first service. In some embodiments, the machine may be further configured to: receive, from the user, a request to use a second service of the service provider, the second service being different from the first service; determine the stored usage measure for the user and a second usage measure requirement for the second service of the service provider; determine if the stored usage measure satisfies the second usage measure requirement; and enable the user to use the second service of the service provider in response to a determination that the stored usage measure satisfies the second usage measure requirement. In some embodiments, the machine may be further configured to increase the stored usage measure by a second amount in response to the user using the second service of the service provider. The second amount may be different from the first amount.

In some embodiments, the machine is further configured to present the user with a proposal to use an alternative service of the service provider instead of the first service in response to a determination that the usage measure does not satisfy the first usage measure requirement, but that the usage measure does satisfy an alternative usage measure requirement for the alternative service, and enable the user to use the alternative service of the service provider.

In some embodiments, the service provider may comprise a PaaS service provider.

In some embodiments, a non-transitory machine-readable storage device may store a set of instructions that, when executed by at least one processor, causes the at least one processor to perform the operations and method steps discussed within the present disclosure.

FIG. 1 is a network diagram illustrating a client-server system, in accordance with an example embodiment. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser, such as the INTERNET EXPLORER browser developed by Microsoft Corporation of Redmond, Wash. State), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 may be coupled to, and provide web and programmatic interfaces to, application servers 126. The application servers 126 may be, in turn, coupled to one or more database servers 128 that facilitate access to one or more databases 130. The web servers 124, Application Program Interface (API) servers 125, application servers 126, and database servers 128 may host cross-functional services 132. The application servers 126 may further host domain applications 134.

The cross-functional services 132 provide services to users and processes that utilize the enterprise application platform 112. For instance, the cross-functional services 132 may provide portal services (e.g., web services), database services, and connectivity to the domain applications 134 for users that operate the client machine 116, the client/server machine 117 and the small device client machine 122. In addition, the cross-functional services 132 may provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are, of course, not limited to such an architecture, and could equally well find application in a distributed, or peer-to-peer, architecture system.

Figure 2:
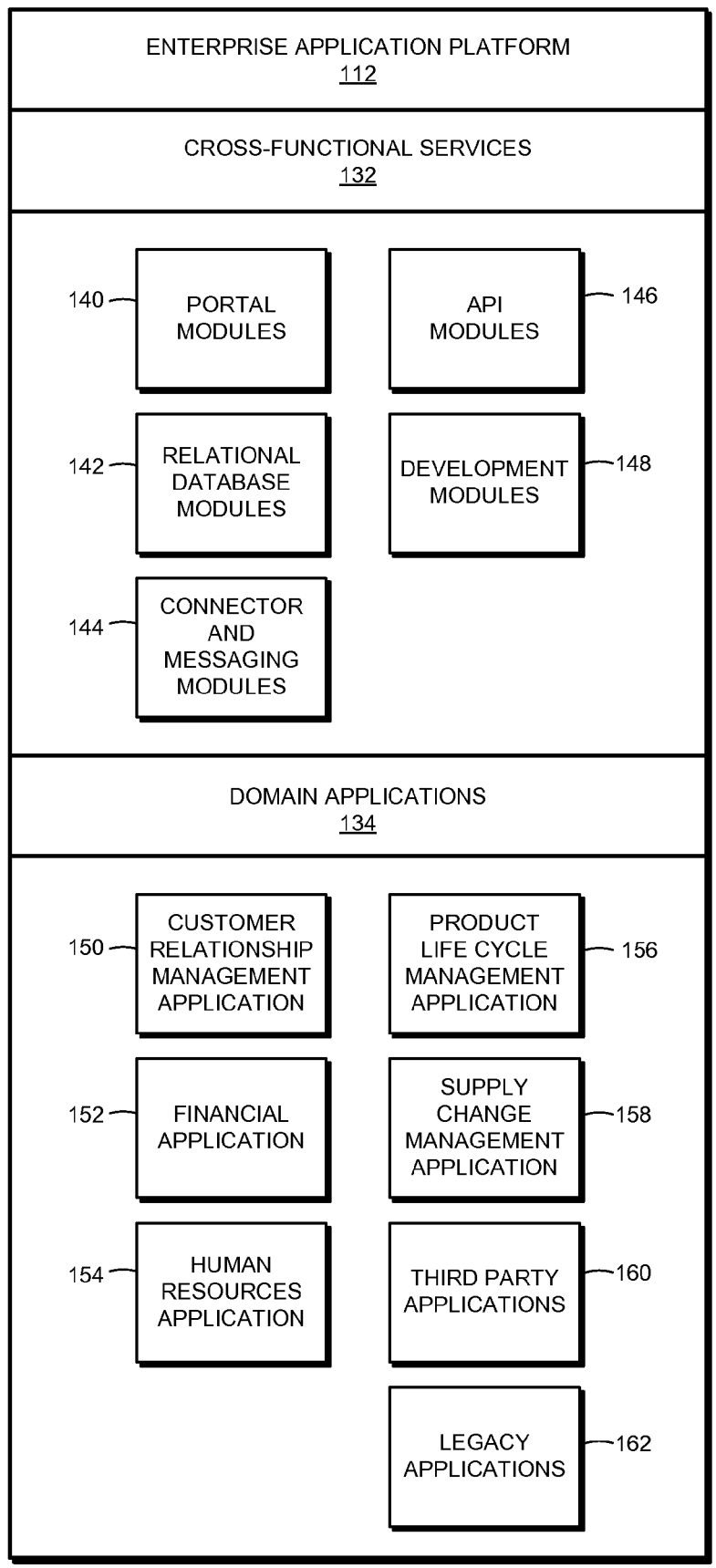
FIG. 2 is a block diagram illustrating enterprise applications and services in an enterprise application platform, in accordance with an example embodiment.

FIG. 2 is a block diagram illustrating enterprise applications and services in an enterprise application platform 112, in accordance with an example embodiment. The enterprise application platform 112 includes cross-functional services 132 and domain applications 134. The cross-functional services 132 may include portal modules 140, relational database modules 142, connector and messaging modules 144, Application Program Interface (API) modules 146, and development modules 148.

The portal modules 140 may enable a single point of access to other cross-functional services 132 and domain applications 134 for the client machine 116, the small device client machine 122 and the client/server machine 117. The portal modules 140 may be utilized to process, author, and maintain web pages that present content (e.g., user interface elements and navigational controls) to the user. In addition, the portal modules 140 may enable user roles, a construct that associates a role with a specialized environment that is utilized by a user to execute tasks, utilize services, and exchange information with other users and within a defined scope. For example, the role may determine the content that is available to the user and the activities that the user may perform. The portal modules 140 include a generation module, a communication module, a receiving module, and a regenerating module. In addition, the portal modules 140 may comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 142 may provide support services for access to the database(s) 130, which includes a user interface library 136. The relational database modules 142 may provide support for object relational mapping, database independence, and distributed computing. The relational database modules 142 may be utilized to add, delete, update, and manage database elements. In addition, the relational database modules 142 may comply with database standards and/or utilize a variety of database technologies including SQL, SQLDBC, Oracle, MySQL, Unicode, JDBC.

The connector and messaging modules 144 may enable communication across different types of messaging systems that are utilized by the cross-functional services 132 and the domain applications 134 by providing a common messaging application processing interface. The connector and messaging modules 144 may enable asynchronous communication on the enterprise application platform 112.

The Application Program Interface (API) modules 146 may enable the development of service-based applications by exposing an interface to existing and new applications as services. Repositories may be included in the platform as a central place to find available services when building applications.

The development modules 148 may provide a development environment for the addition, integration, updating, and extension of software components on the enterprise application platform 112 without impacting existing cross-functional services 132 and domain applications 134.

Turning to the domain applications 134, the customer relationship management application 150 may enable access to and may facilitate collecting and storing of relevant personalized information from multiple data sources and business processes. Enterprise personnel that are tasked with developing a buyer into a long-term customer may utilize the customer relationship management applications 150 to provide assistance to the buyer throughout a customer engagement cycle.

Enterprise personnel may utilize the financial applications 152 and business processes to track and control financial transactions within the enterprise application platform 112. The financial applications 152 may facilitate the execution of operational, analytical, and collaborative tasks that are associated with financial management. Specifically, the financial applications 152 may enable the performance of tasks related to financial accountability, planning, forecasting, and managing the cost of finance.

The human resource applications 154 may be utilized by enterprise personnel and business processes to manage, deploy, and track enterprise personnel. Specifically, the human resource applications 154 may enable the analysis of human resource issues and facilitate human resource decisions based on real time information.

The product life cycle management applications 156 may enable the management of a product throughout the life cycle of the product. For example, the product life cycle management applications 156 may enable collaborative engineering, custom product development, project management, asset management, and quality management among business partners.

The supply chain management applications 158 may enable monitoring of performances that are observed in supply chains. The supply chain management applications 158 may facilitate adherence to production plans and on-time delivery of products and services.

The third-party applications 160, as well as legacy applications 162, may be integrated with domain applications 134 and utilize cross-functional services 132 on the enterprise application platform 112.

In some embodiments, gamification techniques may be employed to engage users in a way that keeps support costs low for a service provider. Gamification is the use of game-thinking and game mechanics in a non-game context in order to engage users and solve problems. Gamifications may provide a way of engaging people and letting them participate with a service provider system in an exciting and engaging manner.

In some embodiments, a service provider may set the restrictions to its offered PaaS services. This restriction scheme may be accomplished by classifying the offered services into different levels (e.g., beginner, intermediate, expert/advanced). The idea behind this technique is that not all users can access advanced services, and, therefore, not all users can request support for these services, thereby keeping support costs low. In some embodiments, the classification is implemented in such a way that the services classified as being for beginners require very little to no support and may be properly understood with static support such as FAQ's, Wikis, videos and other once-off support material. Users may be rewarded for using services of the service provider by having their classification level increased.

In some embodiments, when a user begins using the services of a service provider, that user may be assigned a usage measure. The usage measure may be any measure that indicates how much the user has used or consumed services of the service provider. Examples of usage measures include, but are not limited to, points, levels, and badges. Although points and levels are referred to throughout this disclosure, it is contemplated that other forms of usage measures may be used in their place and are also within the scope of the present disclosure.

In some embodiments, a user may be initially assigned a usage measure that reflects a beginner level classification when the user first registers with or begins using the services of the service provider. As the user consumes more services of the service provider, the user's usage measure may be adjusted to reflect the fact that the user is using the services more and becoming more experienced with them. For example, if the usage measure is a number of points, the user's points total may be increased in response to the user consuming a service. In some embodiments, the user may also be assigned a level classification (e.g., beginner, intermediate, expert/advanced) based on the user's point total. It is contemplated that other usage measure schemes are also within the scope of the present disclosure.

Figure 3:
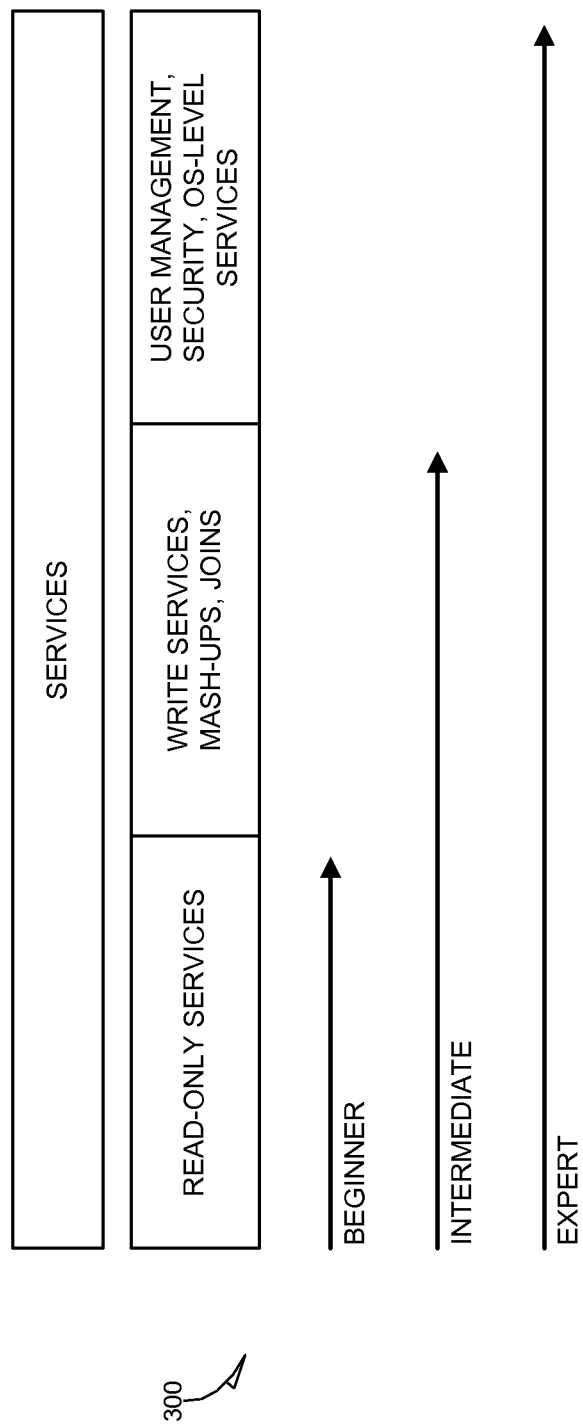
FIG. 3 is a diagram illustrating different service classification levels, in accordance with an example embodiment.

FIG. 3 is a diagram illustrating different service classification levels 300, in accordance with an example embodiment. In FIG. 3, the service classification levels 300 include BEGINNER, INTERMEDIATE, and EXPERT. It is contemplated that any number of classification levels may be employed within the scope of the present disclosure. In some embodiments, at least two different classification levels are employed.

Each classification level may have corresponding services that a user having that classification level may be allowed to use. In one example shown in FIG. 3, users having a usage measure corresponding to BEGINNER services may be restricted to only using a first set of services (e.g., read-only services), users having a usage measure corresponding to INTERMEDIATE services may be restricted to only using the first set of services and a second set of services (e.g., write services, mash-ups, and joins), and users having a usage measure corresponding to EXPERT services may use be restricted to only using the first set of services, the second set of service, and a third set of services (e.g., user management services, security services, and operating system (OS) level services).

By only allowing basic services to BEGINNER users, the service provider may avoid having the BEGINNER users ask questions about the more advanced services because the BEGINNER users simply do not have access to them. In this scheme, BEGINNER users may gradually be able to access these services once they have reached a certain level, e.g., by increasing their usage measure through using services corresponding to their current level classification. It is contemplated that the number of levels used and what points and thresholds are defined for each border between these levels may vary.

The mapping of the required usage measures (e.g., points) to the available services may be performed by a gamification engine, which will be discussed in further detail below. This mapping metadata may be stored in a metadata repository of the gamification engine. One example of a point-access-scheme is shown in the following table:

| Cloud Service | Points Required for Consumption | Points Provided for Consumption |
| --- | --- | --- |
| Read-Only Services | 0 | 10 |
| Mash-Ups | 100 | 100 |
| Joins | 100 | 100 |
| Write Services | 100 | 100 |
| User Management | 1,000 | 500 |
| Security | 1,000 | 500 |
| OS-Level Services | 1,000 | 500 |

In this example, BEGINNER services (e.g., read-only services) require a user to have 0 points in order for the user to consume them, so a user can begin using them right away when first interacting with the service provider. Upon consumption of these BEGINNER services, a user may be awarded 10 points. The more a user uses these BEGINNER services, the more points the user acquires, which brings the user closer to being able to use the next level of services, which in this example are the INTERMEDIATE services. Here, INTERMEDIATE services (e.g., mash-ups, joins, and write services) require a user to have 100 points in order for the user to consume them, and they result in the user being awarded 100 points upon their consumption. Finally, in this example, EXPERT services (e.g., user management services, security services, and OS-level services) require a user to have 1,000 points in order for the user to consume them, and they result in the user being awarded 500 points upon their consumption. It is contemplated that other service classifications and corresponding usage measure requirements and awards may be employed within the scope of the present disclosure. A service provider may define any number of levels and any point thresholds and awards that fit into the service provider's scenario.

As a result of only allowing users access to a restricted set of services and then slowly leveling them up in a way based on their usage of this restricted set of services, a service provider may ensure that the questions they are receiving are based on a minimum level of experience users have with the services of the service provider.

Figure 4:
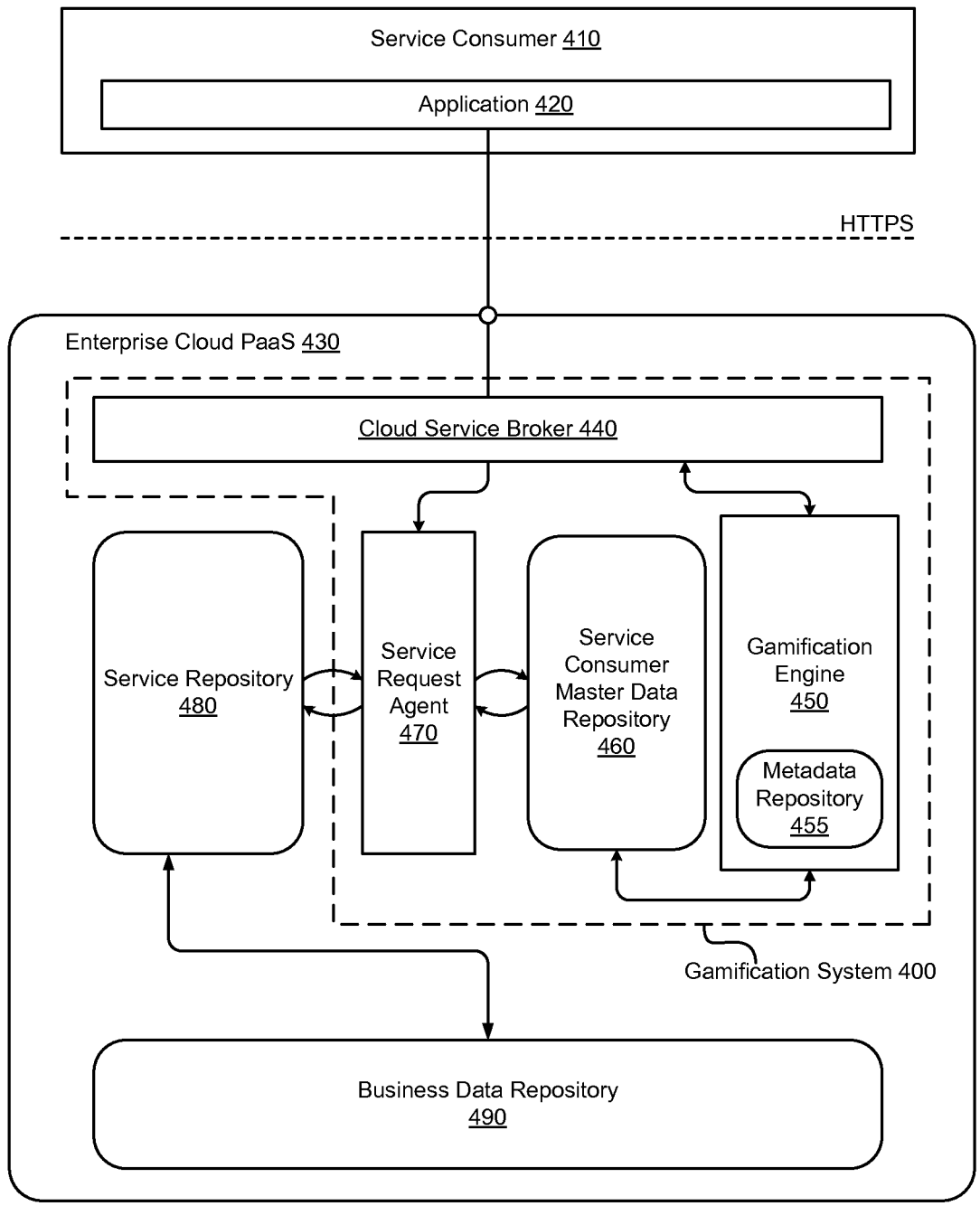
FIG. 4 is a block diagram of a gamification system, in accordance with an example embodiment.

FIG. 4 is a block diagram of a gamification system 400, in accordance with an example embodiment. In some embodiments, the gamification system 400 may be configured to receive, from a user, a request to use a first service of a service provider, determine a usage measure for the user and a first usage measure requirement for the first service, determine if the usage measure satisfies the first usage measure requirement, and enable the user to use the first service of the service provider in response to a determination that the usage measure satisfies the first usage measure requirement.

In some embodiments, the usage measure may be a level classification and the first usage measure requirement may be a minimum level classification required to use the first service of the service provider. In some embodiments, the usage measure may be a number of points and the first usage measure requirement may be a minimum number of points required to use the first service of the service provider. It is contemplated that other types of usage measures and usage measure requirements are also within the scope of the present invention.

In some embodiments, the gamification system 400 may be further configured to store the usage measure, and to increase the stored usage measure by a first amount in response to the user using the first service. In some embodiments, the gamification system 400 may also be configured to receive, from the user, a request to use a second service of the service provider. The second service may be different from the first service. The gamification system 400 may then determine the stored usage measure for the user and a second usage measure requirement for the second service, and determine if the stored usage measure satisfies the second usage measure requirement for the second service. The gamification system 400 may be configured to enable the user to use the second service of the service provider in response to a determination that the stored usage measure satisfies the second usage measure requirement for the second service. In some embodiments, the gamification system 400 may increase the stored usage measure by a second amount in response to the user using the second service of the service provider. The second amount may be different (e.g., greater than or less than) the first amount.

In some embodiments, the gamification system 400 may be further configured to present the user with a proposal to use an alternative service of the service provider instead of the first service in response to a determination that the usage measure does not satisfy the first usage measure requirement, but that the usage measure does satisfy an alternative usage measure requirement for the alternative service. The gamification system 400 may then enable the user to use the alternative service of the service provider.

The gamification system 400 may reside on, or be otherwise communicatively or operationally coupled to, an enterprise cloud PaaS system 430 (e.g., enterprise application platform 112 in FIG. 1) or some other service provider system. In some embodiments, the gamification system 400 may comprise a cloud service broker 440, a gamification engine 450, a service consumer master data repository 460, and a service request agent 470.

A service consumer 410 may request to use a service of the enterprise cloud PaaS system 430 and may comprise any software application 420. In some embodiments, someone writing code in an integrated development environment (IDE) and testing their Representational State Transfer (REST) or Simple Object Access Protocol (SOAP) may call the enterprise cloud PaaS system 430. The software application 420 may also be a finished application.

The service consumer 410 may comprise any module or component that calls the enterprise cloud PaaS system 430 to request a service. In some embodiments, the cloud service broker 440 receives the call and decides what to do with it. In one example, the cloud service broker 440 may receive a request from the service consumer 410 for access to use a service classified as requiring an expert level. Here, the cloud service broker 440 may decide whether to grant the service consumer 410 access to the expert service or to block access to that expert service. In some embodiments, the cloud service broker 440 communicates with other components in the enterprise cloud PaaS system 430 in order to make and carry out this decision. In some embodiments, the cloud service broker 440 may communicate with the gamification engine 450 and the service request agent 470 in order to make and carry out this decision.

The cloud service broker 440 may contact the gamification engine 450. The gamification engine 450 may check to see if the service consumer 410 has the right to access and use the service that it is requesting. The gamification engine 450 may comprise the rules and requirements (e.g., the usage measure requirements) for access to the services of the PaaS system 430. The gamification engine 450 may have a temporary metadata repository 455 where it temporarily stores usage measures (e.g., points and classification levels) corresponding to service consumers (e.g., users). If the service consumer 410 frequently calls in, then the usage measure of the service consumer 410 may be cast in the temporary metadata repository 455 of the gamification engine 450. If it is the very first time that the service consumer 410 is calling in to request access to a service or if the service consumer 410 does not call in very often, then the gamification engine 450 may look up the usage measure in the service consumer master data repository 460, which may store this information for all registered service consumers 410.

The temporary metadata repository 455 or the service consumer master data repository 460 may provide the usage measure (e.g., point or classification level or both) of the service consumer 410. For example, if the service consumer 410 has 127 points, then the service consumer 410 may only be authorized to use beginner level and intermediate level services. The temporary metadata repository 455 or the service consumer master data repository 460 may provide any of this information. The gamification engine 450 may then check that 127 points or the beginner and intermediate levels against the level of service that the service consumer 410 is trying to request. If the service consumer 410 is trying to request a service requiring that the service consumer 410 be at an expert level, then the gamification engine 450 may determine that the service consumer 410 is not authorized to use this service and provide this information to the cloud service broker 440, which may then deny the service consumer 410 access to use that service.

If, on the other hand, the usage measure of the service consumer 410 is sufficient, then the gamification engine 450 may communicate this information back to the cloud service broker 440. The cloud service broker 440 may then communicate this information with, or send a request to, the service request agent 470. The service request agent 470 may then access a service repository 480, which may comprise all of the services available on the enterprise cloud PaaS system 430. The service request agent 470 may choose the appropriate service from the service repository 480 and fulfill the call by enabling the service consumer 410 to use the requested service. The service repository 480 may have access to business data in a business data repository 490. The service repository 480 may retrieve the business data from the business data repository 490, and then provide it to the service request agent 470. The service request agent 470 may communicate the business data back to the service broker 440, which may then send it to the application 420. Upon completion of the service, the service request agent 470 may then report the completion of the service back to the service consumer master data repository 460, which may then update the usage measure of the service consumer 410 (e.g., by adding points).

In some embodiments, in order for the user to be recognized as an intermediate or advanced user, the proficiency level must be added to the master data in the service consumer master data repository 460, which may be performed within the enterprise cloud platform. The service consumer 410 may call the cloud service broker 440 and check to see if the user has sufficient points. For each usage of the service, the user in return may be provided some points or some other increase in the user's usage measure.

In some embodiments, if the usage measure in the service consumer master data repository 460 is sufficient for the requested service, then access to the service may be granted. A service handle may be returned by the service consumer master data repository 460. This service handle may identify the user with the appropriate proficiency level and also track the user's actions. If the user accesses different services, then points are automatically added to the master data in the service consumer master data repository 460 by the gamification engine 450. The gamification engine 450 may temporarily store the actions of current users and update the service consumer master data in the service consumer master data repository 460 accordingly. The gamification engine 450 may provide notification to the user when the user reaches a new classification level, which is when the portfolio of services the user may access is expanded.

Figure 5:
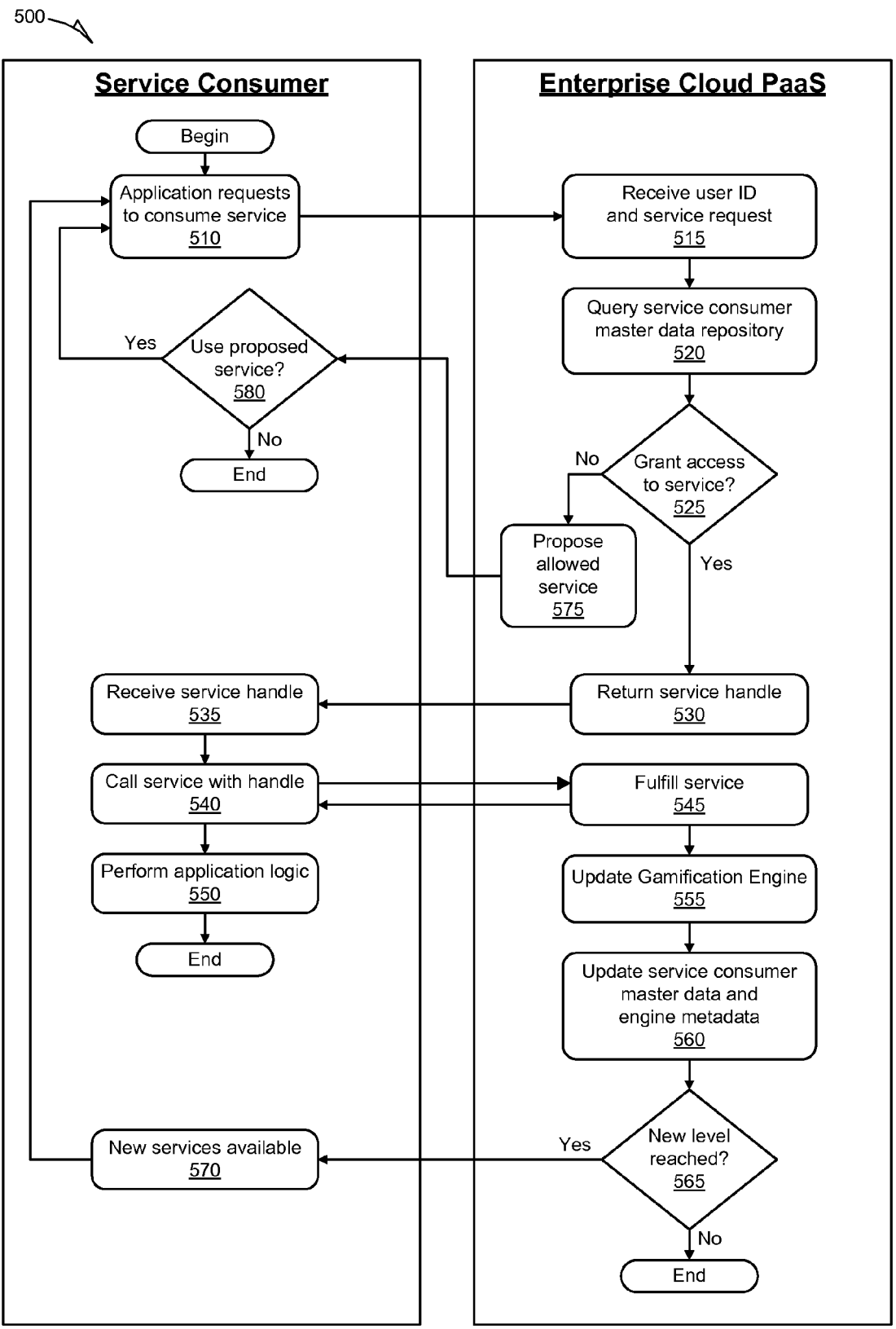
FIG. 5 illustrates a process flow for enabling service consumption based on gamification level classification, in accordance with an example embodiment.

FIG. 5 illustrates a process flow 500 for enabling service consumption based on gamification level classification, in accordance with an example embodiment. The operations in the process flow 500 may be performed by components of a service consumer and an enterprise cloud PaaS system. Although specific components of the enterprise cloud PaaS system are referred to below in terms of performing certain operations, it is contemplated that these operations may be performed by other components.

At operation 510, an application of a service consumer may send a request to the enterprise cloud PaaS system to consume a service. The application may call a service broker of the enterprise PaaS system. At operation 515, the enterprise cloud PaaS system may receive the service request and a user identification (ID) of the service consumer. In some embodiments, a service broker of the PaaS system may receive this information. At operation 520, the gamification engine may query the service consumer master data repository for the usage measure for the user ID and the usage measure requirement for the requested service. At operation 525, the gamification engine may determine whether access to the requested service should be granted to the service consumer based on whether the usage measure is sufficient to satisfy the usage measure requirement.

If it is determined that access to the requested service should not be granted, then, at operation 575, the PaaS system may deny the user access to the requested service and propose another service for the service consumer to use, one for which the corresponding usage measure requirement is satisfied by the usage measure. For example, the PaaS system may inform the user that he or she does not have the right level for the requested service, but that there are one or more other services that match the user's profile and skill level. At operation 580, the service consumer may decide whether or not to use the proposed service. If the service consumer decides not to use the proposed service, then the process may come to an end. If the service consumer decides to use the proposed service, then the service consumer may request to consume the proposed service back at operation 510.

If, at operation 525, it is determined that access to the requested service should be granted, then, at operation 530, the PaaS system may return a service handle to the service consumer. The service handle may be a secure ID that the service consumer may use in the future as identification of what classification of services the user is authorized to use, thereby avoiding redundant steps because the user has already shown that he or she the right authorization level the first time. For subsequent requests, the gamification engine check may be bypassed and the service may simply be called.

At operation 535, the service consumer may receive the service handle. At operation 540, the service consumer may call the service using the service handle. At operation 545, the PaaS system may fulfill the service request and provide the service consumer with access to the requested service. At operation 550, the service consumer may perform application logic in using the requested service. On the PaaS system side, after the service consumer uses the service, at operation 555, the gamification engine may be updated by being informed of this use of the service. At operation 560, the gamification engine in turn may update the service consumer master data and the gamification engine metadata.

At operation 565, the gamification engine may determine whether or not the user has reached a new level of access to services. For example, the gamification engine may check to see if the user's updated usage measure has been updated in a way that satisfies a usage measure requirement of a level of services that the user's usage measure previously did not satisfy. If the user's updated usage measure does satisfy a usage measure requirement of a level of services that the user's usage measure previously did not satisfy, then the user has reached a new level of services and may be informed of the availability of this new level of services at operation 570. If the user's updated usage measure does not satisfy a usage measure requirement of a level of services that the user's usage measure previously did not satisfy, then the process may come to an end.

Figure 6:
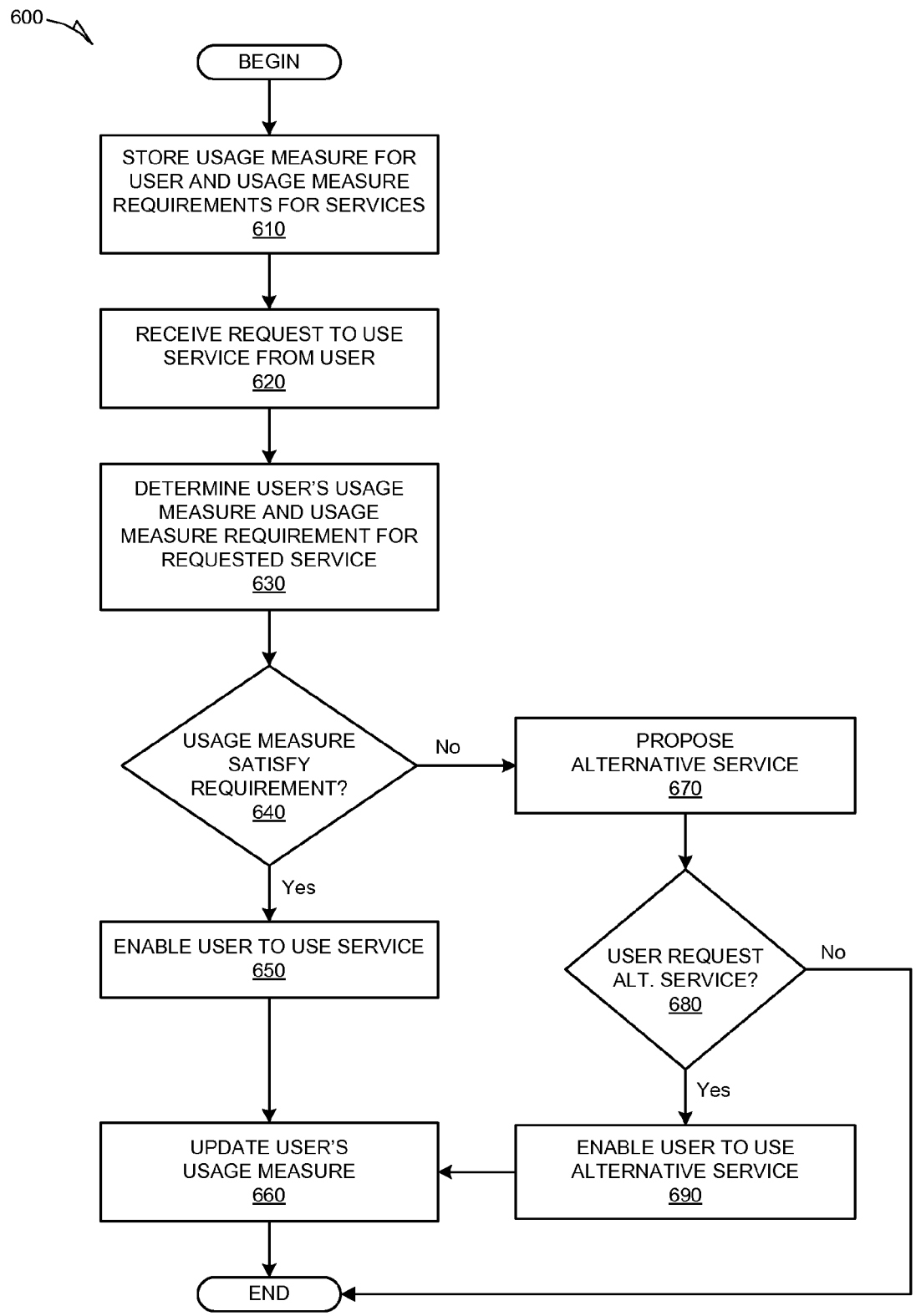
FIG. 6 is a flowchart illustrating a method of enabling service consumption based on gamification level classification, in accordance with an example embodiment.

FIG. 6 is a flowchart illustrating a method 600 of enabling service consumption based on gamification level classification, in accordance with an example embodiment. It is contemplated that any of the other features described within the present disclosure may be incorporated into method 600.

At operation 610, a gamification system may store a usage measure for a user and usage measure requirements for services being made available by a service provider. At operation 620, the gamification system may receive a request to use one of the services from the user. At operation 630, the gamification system may determine the usage measure of the user and the usage measure requirement for the requested service. At operation 640, the gamification system may determine whether the usage measure of the user satisfies the usage measure requirement for the requested service.

If the usage measure of the user satisfies the usage measure requirement, then, at operation 650, the gamification system may enable the user to use the requested service. Then, at operation 660, the gamification system may update (e.g., add points to) the usage measure of the user to reflect the use of the requested service. The method may then come to an end.

If the usage measure of the user does not satisfy the usage measure requirement, then, at operation 670, the gamification system may deny the user access to the requested service propose an alternative service that has a usage measure requirement which the usage measure satisfies.

At operation 680, the gamification system may then determine whether the user has requested to use the proposed alternative service. If the user has not requested to use the proposed alternative service, then the method may come to an end. If the user has requested to use the proposed alternative service, then, at operation 690, the gamification system may enable the user to use the proposed alternative service. The gamification system may then, at operation 660, update the usage measure of the user to reflect the use of the proposed alternative service. The method may then come to an end.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 7:
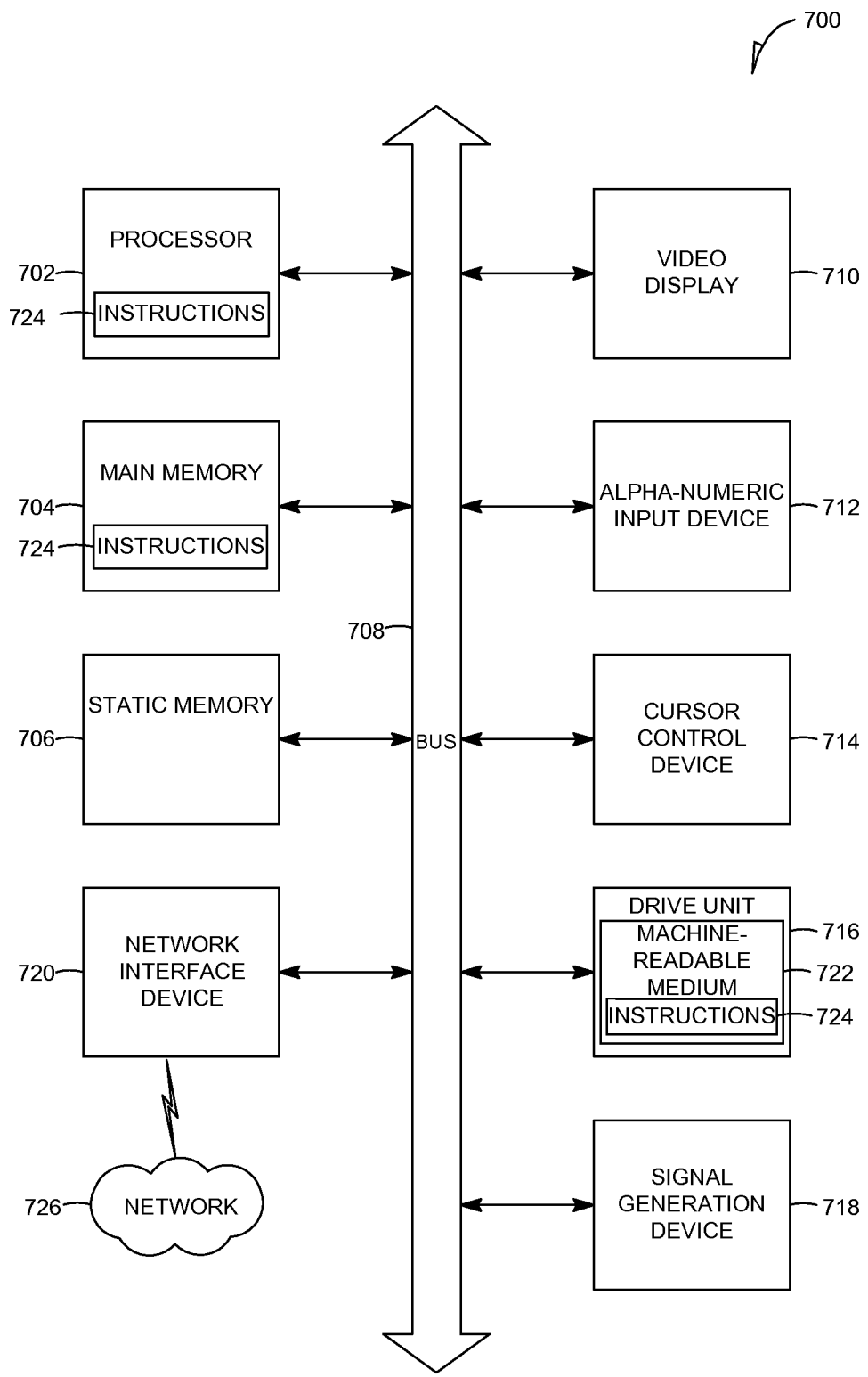
FIG. 7 is a block diagram of an example computer system on which methodologies described herein may be executed, in accordance with an example embodiment.

FIG. 7 is a block diagram of a machine in the example form of a computer system 700 within which instructions 724 for causing the machine to perform any one or more of the methodologies discussed herein may be executed, in accordance with an example embodiment. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation (or cursor control) device 714 (e.g., a mouse), a disk drive unit 716, a signal generation device 718 (e.g., a speaker), and a network interface device 720.

The disk drive unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media. The instructions 724 may also reside, completely or at least partially, within the static memory 706.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
    receiving, from a user, a request to use a first service of a service provider;
    determining a usage measure for the user and a first usage measure requirement for the first service of the service provider, wherein the usage measure for the user is stored and is a measure of an amount the user has consumed services of the service provider, and the first usage measure requirement is a minimum usage measure required to use the first service of the service provider; determining if the usage measure satisfies the first usage measure requirement; enabling, by a machine having a memory and a processor, the user to use the first service of the service provider in response to a determination that the usage measure satisfies the first usage measure requirement;
    increasing the stored usage measure by a first amount in response to the user using the first service;
    receiving, from the user, a request to use a second service of the service provider, the second service being different from the first service;
    determining the stored usage measure for the user and a second usage measure requirement for the second service of the service provider;
    determining if the stored usage measure satisfies the second usage measure requirement;
    enabling the user to use the second service of the service provider in response to a determination that the stored usage measure satisfies the second usage measure requirement; and
    increasing the stored usage measure by a second amount in response to the user using the second service of the service provider.

2. The method of claim 1, wherein the usage measure is a level classification and the first usage measure requirement is a minimum level classification required to use the first service of the service provider.

3. The method of claim 1, wherein the usage measure is a number of points and the first usage measure requirement is a minimum number of points required to use the first service of the service provider.

4. The method of claim 1, wherein the second amount is different from the first amount.

5. The method of claim 1, further comprising: presenting the user with a proposal to use an alternative service of the service provider instead of the first service in response to a determination that the usage measure does not satisfy the first usage measure requirement, but that the usage measure does satisfy an alternative usage measure requirement for the alternative service; and enabling the user to use the alternative service of the service provider.

6. The method of claim 1, wherein the service provider comprises a Platform as a Service (PaaS) service provider.

7. A system comprising: a machine having a memory and at least one processor, the machine being configured to: receive, from a user, a request to use a first service of a service provider; determine a usage measure for the user and a first usage measure requirement for the first service of the service provider, wherein the usage measure for the user is stored and is a measure of how much the user has used services of the service provider, and the first usage measure requirement is a minimum usage measure required to use the first service of the service provider; determine if the usage measure satisfies the first usage measure requirement; enable the user to use the first service of the service provider in response to a determination that the usage measure satisfies the first usage measure requirement; increase the stored usage measure by a first amount in response to the user using the first service; receive, from the user, a request to use a second service of the service provider, the second service being different from the first service; determine the stored usage measure for the user and a second usage measure requirement for the second service of the service provider; determine if the stored usage measure satisfies the second usage measure requirement; enable the user to use the second service of the service provider in response to a determination that the stored usage measure satisfies the second usage measure requirement; and increase the stored usage measure by a second amount in response to the user using the second service of the service provider.

8. The system of claim 7, wherein the usage measure is a level classification and the first usage measure requirement is a minimum level classification required to use the first service of the service provider.

9. The system of claim 7, wherein the usage measure is a number of points and the first usage measure requirement is a minimum number of points required to use the first service of the service provider.

10. The system of claim 7, wherein the second amount is different from the first amount.

11. The system of claim 7, wherein the machine is further configured to:
    present the user with a proposal to use an alternative service of the service provider instead of the first service in response to a determination that the usage measure does not satisfy the first usage measure requirement, but that the usage measure does satisfy an alternative usage measure requirement for the alternative service; and
    enable the user to use the alternative service of the service provider.

12. The system of claim 7, wherein the service provider comprises a Platform as a Service (PaaS) service provider.

13. A non-transitory machine-readable storage device, tangibly embodying a set of instructions that, when executed by at least one processor, causes the at least one processor to perform a set of operations comprising:

receiving, from a user, a request to use a first service of a service provider;

determining a usage measure for the user and a first usage measure requirement for the first service of the service provider, wherein the usage measure for the user is stored and is a measure of how much the user has used services of the service provider, and the first usage measure requirement is a minimum usage measure required to use the first service of the service provider;

determining if the usage measure satisfies the first usage measure requirement;

enabling the user to use the first service of the service provider in response to a determination that the usage measure satisfies the first usage measure requirement;

increasing the stored usage measure by a first amount in response to the user using the first service;

receiving, from the user, a request to use a second service of the service provider, the second service being different from the first service;

determining the stored usage measure for the user and a second usage measure requirement for the second service of the service provider;

determining if the stored usage measure satisfies the second usage measure requirement;

enabling the user to use the second service of the service provider in response to a determination that the stored usage measure satisfies the second usage measure requirement; and increasing the stored usage measure by a second amount in response to the user using the second service of the service provider.

* * * * *